UNITED STATES PATENT OFFICE.

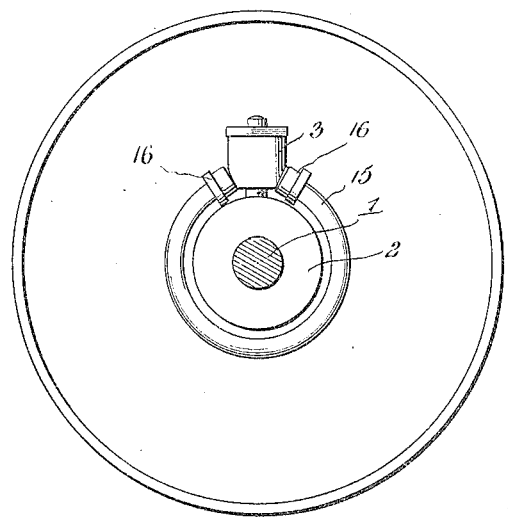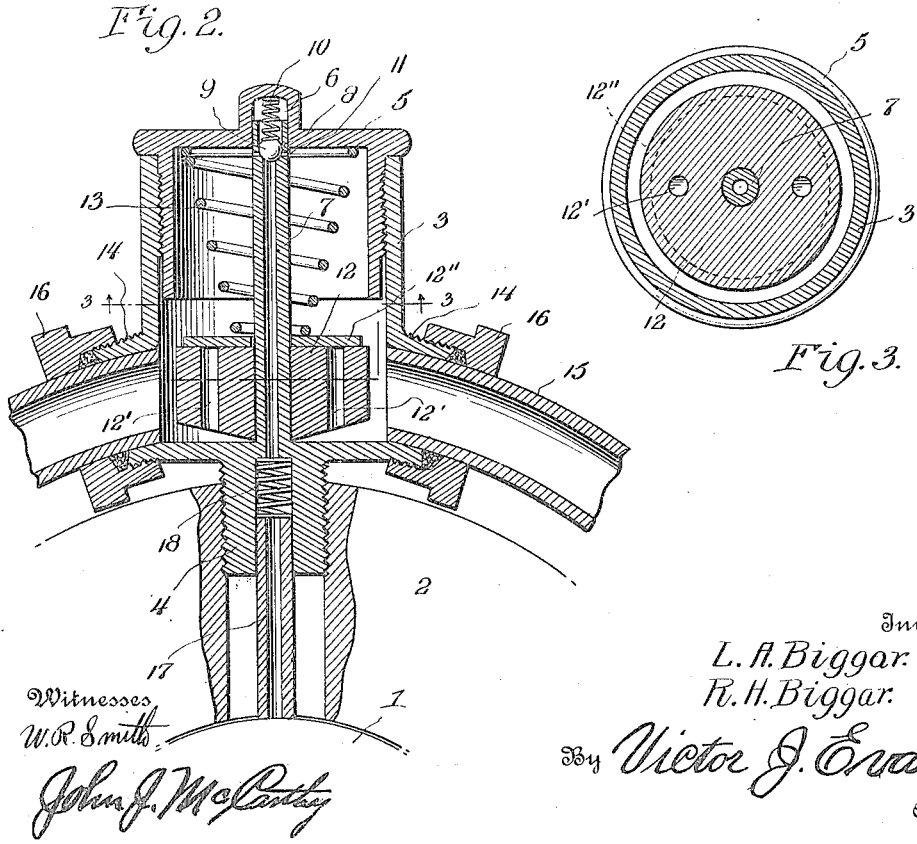

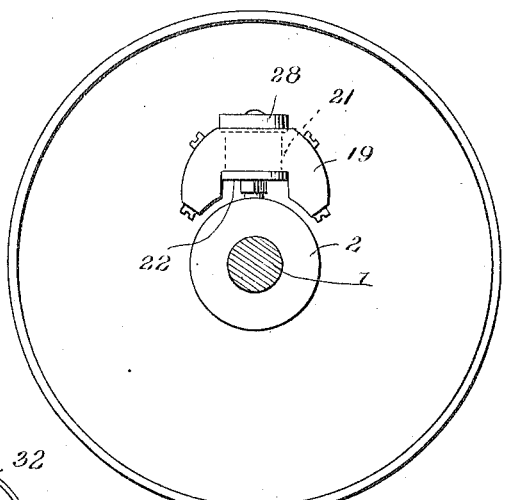
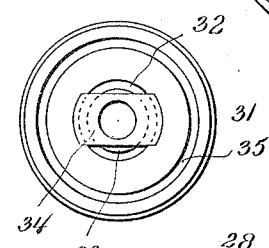
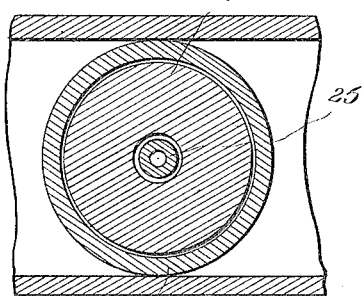
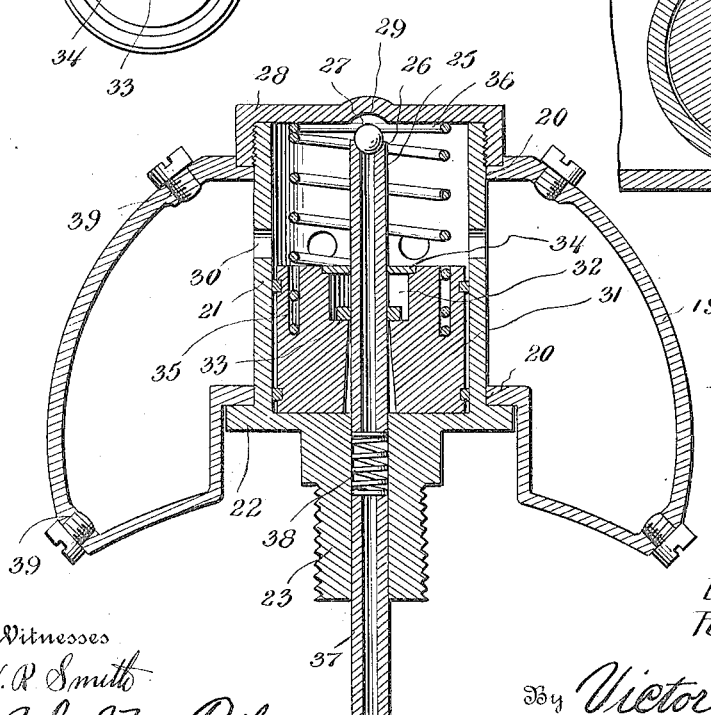

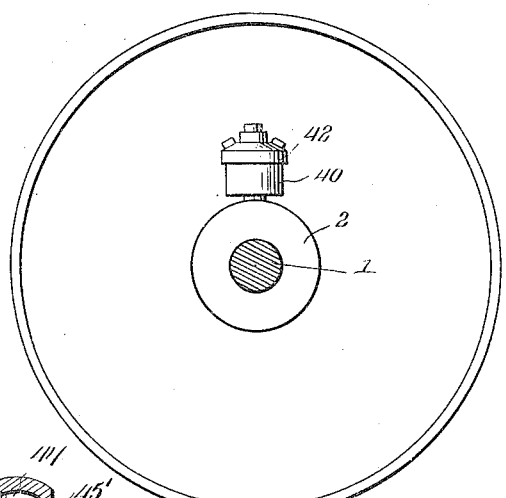
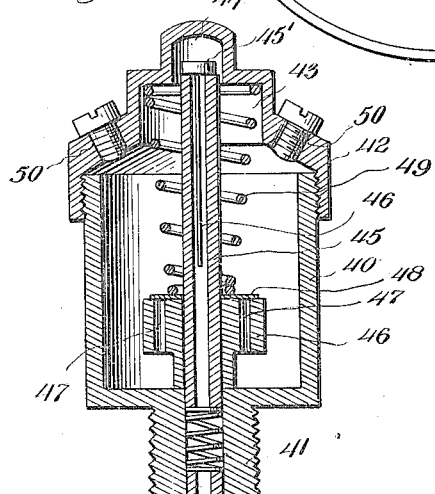
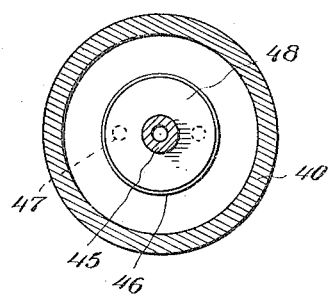
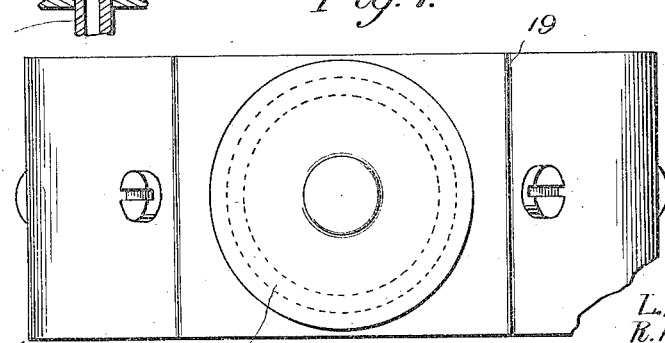

LEROY A. BIGGAR AND RUTHFORD H. BIGGAR, OF ONEIDA, NEW YORK.

LUBRICATING DEVICE.

1,135,873.

Specification of Letters Patent.

Patented Apr. 13, 1915.

Application filed April 25, 1914. Serial No. 834,427.

*To all whom it may concern:*

Be it known that we, LEROY A. BIGGAR and RUTHFORD H. BIGGAR, citizens of the United States, residing at Oneida, in the county of Madison and State of New York, have invented new and useful Improvements in Lubricating Devices, of which the following is a specification.

This invention relates to improvements in lubricating devices and has particular application to a self-feeding lubricator for loose pulleys and other revolving elements.

In carrying out the present invention, it is our purpose to provide a device of the class described whereby oil or other lubricant will be fed to the shaft of a loose pulley or similar revolving element in the initial movement of such pulley and the flow of lubricant cut off in the continued rotation of the pulley thereby insuring the easy running of the pulley and preventing waste of the lubricant.

It is also our purpose to provide a lubricating device which will embody among other features a reservoir secured to the hub of the loose pulley and extending radially therefrom and communicating with the shaft of the hub, and a plunger within the reservoir and movable under the action of centrifugal force in the initial turning of the hub to feed the oil or other lubricant to the shaft, and prevent the flow of lubricant in the continued rotation of the hub, the plunger being restored to normal position immediately succeeding the stopping of the hub so that when the loose pulley is again put into service the lubricant will be fed to the shaft thereof in the initial rotation of the same.

A further object of our invention is to provide a lubricating device of the type set forth which will embrace the desired features of simplicity, efficiency and durability, which will be entirely automatic in operation, which may be readily and quickly installed and which will embody few parts and these so correlated and arranged as to reduce the possibility of derangement to a minimum.

With the above and other objects in view, the invention consists in the construction, combination and arrangement of parts hereinafter set forth in and falling within the scope of the claim.

In the accompanying drawings; Figure 1 is a view in side elevation of a loose pulley constructed in accordance with the present invention. Fig. 2 is an enlarged fragmentary vertical sectional view through the lubricating device. Fig. 3 is a transverse sectional view on the line 3—3 of Fig. 2. Fig. 4 is a view in side elevation of a loose pulley equipped with a modified form of lubricating device. Fig. 5 is an enlarged vertical sectional view through the device removed from the pulley hub. Fig. 6 is a transverse sectional view therethrough. Fig. 7 is a top plan view of the modified construction shown in Fig. 4. Fig. 8 is a top plan view of the plunger removed from the casing. Fig. 9 is a view in side elevation showing a further modified form of lubricating device. Fig. 10 is a vertical sectional view therethrough. Fig. 11 is a transverse sectional view of the same.

Referring now to the drawings in detail, 1 designates a shaft, while 2 indicates the hub of a loose pulley mounted upon the shaft and adapted to rotate thereon when the belt is shifted from the fast pulley to the loose pulley as is well known.

In the present instance, our improved lubricating device comprises a cylindrical reservoir 3 having one end thereof closed and formed with an outwardly projecting centrally arranged nipple 4, and the opposite end thereof open and threaded interiorly. Threaded into the open end of the reservoir 3 is an inverted cup-shaped cap having the inner face of the end wall thereof formed with a central recess 6. Secured to the bottom wall of the reservoir 3 coaxial with the nipple 4 and extending into the reservoir is a feed tube 7 having the upper end thereof disposed within the recess 6 in the cap 5 and formed with a concaved seat 8 designed to receive a ball valve 9. Interposed between the upper surface of the ball valve 9 and the end wall of the recess 6 is a coiled expansion spring 10 acting to hold the valve normally against its seat. Contiguous the valve seat 8 the tube 7 is formed with laterally extending apertures 11 designed to establish communication between the interior of the feed tube and the reservoir when the valve is unseated.

Disposed concentrically of the feed tube 7 and capable of sliding within the reservoir 3 is a plunger 12 normally engaging the closed end wall of the reservoir and held in such position by means of an expansion spring 13 surrounding the feed tube and having one end bearing against the end wall of the cap and the opposite extremity in engagement with the confronting face of the plunger 12. At diametrically opposite points adjacent to the closed end thereof the reservoir is provided with laterally projecting nipples 14, 14 threaded exteriorly and having the axes thereof disposed in the arc of a circle corresponding with the circumference of the hub of the loose pulley to which the lubricating device is to be applied.

15 designates a split circular tube of any desired cross sectional configuration and having the opposite ends thereof disposed within the nipples 14 and held therein by means of union nuts 16, 16 threaded onto the nipples.

In use, the nipple 4 on the closed end of the reservoir 3 is threaded into an opening formed in the hub 2 radially thereof and opening onto the shaft 1 upon which the hub of the loose pulley is mounted. The circular tube 15 is now disposed about the hub of the pulley and the ends thereof secured within the nipples 14 as just described, the pulley being rotated to dispose the reservoir at the topmost point of the hub thereof and in a vertical plane. The reservoir is now filled with the desired lubricant and the cap threaded into such reservoir to close the same, the plunger 12 resting upon the bottom wall of the reservoir under the action of the spring 13. When the belt is shifted from the fast pulley onto the loose pulley the latter revolves and in the initial rotation thereof the plunger 12 moves outwardly within the reservoir 3 under the action of centrifugal force and against the action of the spring 13 thereby forcing the oil or other lubricant through the ports or apertures 11 in the outer end of the feed tube with the effect to unseat the ball valve 9 against the action of the spring 10 and force the fluid through the feed tube 7 and opening in the hub to the shaft of the pulley. In the continued rotation of the pulley the plunger 12 is held against the outer end of the reservoir under the action of centrifugal force, thereby preventing further flow of oil through the feed tube.

In order that the oil will be conveyed direct from the feed tube 7 to the shaft, a second tube 17 is disposed within the nipple 4 coaxial with the feed tube and the lower end of such tube bears against the shaft 1, a coiled expansion spring 18 being interposed between the confronting ends of the tube 17 and the feed tube to maintain the inner end of the tube 17 in engagement with the shaft. Thus, it will be seen that the lubricant will be forced through the feed tube and the tube 17 onto the shaft of the loose pulley, thereby lubricating the latter so that the loose pulley may revolve freely.

When the loose pulley comes to rest the spring 13 reacts and so restores the plunger 12 to normal position whereby such plunger may be again thrown outwardly under the action of centrifugal force when motion is again imparted to the pulley. To facilitate the restoring of the plunger to normal position under the action of the spring 13, the plunger is preferably formed with longitudinal passages 12′, 12′ disposed at diametrically opposite points, while a disk 12″ is disposed concentrically of the feed tube and lies in face to face contact with the outer end of the plunger to close the openings 12′, 12′. In the outward movement of the plunger, as previously described, the disk maintains the outer ends of the openings or passages 12′ closed, while in the inward movement of the plunger under the action of the spring the ends of the passages are opened, incident to the oil in the passages 12′ engaging the under surface of the disk 12″, thereby facilitating the restoring of the plunger to normal position. It will be noted that this spring 13 insures positive return of the plunger to normal position irrespective of the position of the lubricating device when the pulley is stopped.

In the modified form of the invention illustrated in Figs. 4 to 8 inclusive, the lubricating device comprises an inverted U-shaped reservoir 19 having the parallel walls of the central portion thereof formed with alining openings 20. 21 designates a plunger casing which is preferably circular in cross section and has one end wall thereof closed and formed with a circumferential flange 22 and a depending nipple 23 having the lower extremity thereof screwthreaded as at 24. Suitably connected to the bottom wall of the casing 21 and coaxial with the nipple 23 and projecting into the casing is a feed tube 25 having the upper end thereof concaved as at 26 to receive a ball valve 27, while the open end of the casing is threaded exteriorly and closed by means of a cup-shaped cap 28 threadedly engaging the outer wall of the casing and having the inner surface of the end wall thereof formed centrally with a depression 29 adapted to receive the ball valve 27 when the latter is disengaged from its seat. Previous to the application of the cap 28 to the casing 21 the latter is passed through the alining openings 20, 20 in the parallel walls of the central portion of the inverted U-shaped reservoir 19 from the inner side of such interconnecting portion and the flange 22 engages the inner wall of the interconnecting portion of the U-shaped reservoir to form a fluid tight joint. The cap 28 is now threaded onto the outer end of the casing and the marginal edge of the flange thereof abuts the outer wall of the interconnecting portion of the reservoir to form a fluid tight joint, the cap 28 and flange 22 coacting with each other to prevent movement of the casing relatively to the reservoir. The portion of the side wall of the casing 21 between the parallel walls of the interconnecting member of the U-shaped reservoir is formed with a series of openings 30 whereby the casing 21 and reservoir 19 communicate with each other so that any lubricant within the reservoir will flow into the casing. Mounted within the casing 21 and disposed concentrically of the feed tube 25 is a plunger 31 having the longitudinal bore therein slightly larger in diameter than the feed tube 25. This plunger normally seats against the closed end wall of the casing 21 and the upper end thereof contiguous the bore therein is formed with an annular recess 32 and seated within the recess 32 and surrounding the feed tube 25 is a valve disk 33, while closing the upper end of the recess 32 and holding the valve disk within such recess is a disk 34 having the marginal edge thereof secured within a groove formed in the side wall of the recess 32. An annular groove 35 is formed in the upper end of the plunger 31 concentrically of the recess 32 therein and seated within such groove is one extremity of a coiled expansion spring 36 having the opposite end thereof abutting the end wall of the cap 28, such spring acting to hold the plunger 31 normally against the closed end wall of the plunger casing and restore such plunger to normal position succeeding the sliding thereof within the casing. In practice, the plunger casing and U-shaped reservoir are assembled as previously described and the threaded end 24 of the nipple 23 threaded into the radial opening in the hub of the loose pulley. As the loose pulley revolves under the action of the belt, the plunger 31 slides outwardly in the plunger casing 21 against the action of the spring 36, thereby forcing the lubricant against the valve 27 to unseat the latter and through the feed tube 25 and nipple to the shaft of the pulley. This outward movement of the plunger occurs in the initial rotation of the pulley and in the continued movement thereof the plunger 31 remains at the outer end of the plunger casing against the action of the spring 36 so that further feeding of the oil to the shaft is prevented. When the loose pulley comes to rest, the spring 36 reacts and restores the plunger 31 to normal position. In the outward movement of the plunger under the action of centrifugal force the valve 34 seats tightly against the lower wall of the recess 32 thereby preventing the escape of oil through the bore in the plunger, while in the inward movement of the plunger under the action of the spring 36 the valve 33 disengages the adjacent wall of the recess and so permits the plunger to be easily restored. In the present instance, a tube 37 is disposed within the lower end of the nipple 24 and interposed between the confronting ends of the tube 37 and the feed tube is a coiled expansion spring 38 acting upon the tube 37 to hold the lower end thereof in engagement with the shaft of the pulley, the tube 37 coöperating with the feed tube to carry the oil or other lubricant direct to the shaft. The reservoir 19 is preferably provided with a plurality of filling openings so that such reservoir may be readily replenished irrespective of the position of the lubricating device with respect to the axis of the shaft. In this instance, the reservoir is provided with four filling openings 39, two of such openings being located at the outer ends of the limbs of the reservoir, while the remaining openings are formed in the outer side walls of the reservoir adjacent to the junction of the limbs with the interconnecting portion.

In the construction of the device illustrated in Figs. 9, 10 and 11 of the drawings, the lubricating device comprises a cylindrical cup shaped body 40 having one end closed and formed centrally with an outwardly projecting nipple 41 threaded exteriorly and the opposite end open and threaded exteriorly. Threaded onto the open end of the body 40 and closing the latter is a cap 42 having the under surface thereof formed centrally with a recess 43 disposed concentrically of the axis of the body, and a depression 44 contiguous the recess and centrally thereof. Secured within the nipple 41 and projecting into the casing is a feed tube 45 having the upper end thereof disposed within the recess 44 and closed by means of a valve disk 45' provided with a stem 46 disposed within the feed tube. Surrounding the feed tube 45 within the body 40 and adapted to slide along the tube is a plunger 46 formed at diametrically opposite points with longitudinal passages 47, 47. Disposed concentrically of the tube and lying in face to face contact with the upper face of the plunger 46 and closing the upper ends of the passages 47 is a disk 48, while interposed between the upper surface of the disk 48 and the end wall of the recess 42 is a coiled expansion spring 49 having one end bearing against the end wall of the recess and the opposite extremity in engagement with the disk 48, such spring acting to hold the plunger 48 normally at the bottom of the body 40 and the upper ends of the passages 47 closed. In the present instance, the cap 42 is formed with filling openings 50, 50 threaded interiorly and adapted to be closed by means of suitable plugs.

In practice, the nipple 41 is threaded into the opening in the hub of the loose pulley on the shaft and in the initial rotation of the pulley the plunger 46 slides outwardly under the feed tube 45 against the action of the spring 49, while the valve 45 is disengaged from its seat under the action of centrifugal force. In the outward movement of the plunger the disk 48 maintains the upper ends of the passages 47 closed and the plunger forces the lubricant through the feed tube 45 and onto the shaft of the pulley. In the continued rotation of the pulley the plunger remains at the outer end of the body and so prevents further feeding of the oil or lubricant, while when the pulley is brought to rest the spring reacts to restore the plunger to normal position and in the movement of the plunger under the action of the spring the disk 48 uncovers the upper ends of the passages 47 thereby facilitating the restoring of the plunger. As previously described with reference to the other forms of the lubricating device, a tube 51 is preferably disposed within the lower end of the nipple 41 coaxial with the feed tube and the inner end of the tube 51 is held in engagement with the shaft by some suitable tension means so that the lubricant will be fed direct to the shaft.

While we have herein shown and described certain preferred forms of our invention by way of illustration, we wish it to be understood that we do not limit or confine ourselves to the precise details of construction herein described and delineated, as modification and variation may be made within the scope of the claim without departing from the spirit of the invention.

We claim:

A lubricating device for loose pulleys comprising a reservoir secured to the hub and projecting radially therefrom and opening onto the shaft of said hub, a feed tube within said reservoir, a plunger within the reservoir concentrically of the feed tube therein and movable under the action of centrifugal force to feed the lubricant through said tube to the shaft in the initial movement of the hub, a second tube placed end to end with the first tube and having the remaining end thereof in contact with the pulley shaft, and a spring interposed between the confronting ends of said tubes and holding the last-mentioned tube against the shaft.

In testimony whereof we affix our signatures in presence of two witnesses.

LEROY A. BIGGAR.
RUTHFORD H. BIGGAR.

Witnesses:
 JAMES MOORE,
 THOMAS J. CARSON.

Copies of this patent may be obtained for five cents each, by addressing the "Commissioner of Patents. Washington, D. C."